United States Patent [19]

Doty

[11] 4,429,808
[45] Feb. 7, 1984

[54] DUAL DRIVE ROTARY FEEDER

[75] Inventor: Myron L. Doty, Greenwood, Ind.

[73] Assignee: Moorfeed Corporation, Indianapolis, Ind.

[21] Appl. No.: 331,624

[22] Filed: Dec. 17, 1981

[51] Int. Cl.$^3$ ............................................. B65H 3/42
[52] U.S. Cl. .................................... 221/167; 133/3 A
[58] Field of Search ................ 198/392, 391; 221/160, 221/161, 173, 186, 187, 167; 233/7; 494/51, 52, 55; 133/8 R, 3 A

[56] References Cited

U.S. PATENT DOCUMENTS

| | | | |
|---|---|---|---|
| 3,960,293 | 6/1976 | Sweet et al. | 221/167 X |
| 4,007,854 | 2/1977 | Ervine | 221/167 |
| 4,098,280 | 7/1978 | Ristvedt et al. | 133/8 R X |
| 4,211,248 | 7/1980 | Lafon | 221/186 X |

*Primary Examiner*—Stanley H. Tollberg
*Attorney, Agent, or Firm*—Barnes & Thornburg

[57] ABSTRACT

A serial-orienting and feeding apparatus is disclosed which includes a stationary support fixed substantially midway between the rim of a rotatable tub and the bottom of the tub. A disc is mounted for rotation on the support surface, the surface configuration of the disc being defined by the support surface such that the uppermost portion of the periphery of the disc is immediately adjacent the rim of the tub. The rim and tub are coaxially driven by a common motor driving a two-ended reductor having a chain and sprocket drive on each end. The relative angular velocities of the tub and disc are determined by the sprocket sizes employed. The disc is preferably composed of an artificial resin; i.e., a molded or cast plastic, such as urethane having appropriate elastomeric and surface friction characteristics relative to the articles to be handled by the apparatus.

8 Claims, 3 Drawing Figures

DUAL DRIVE ROTARY FEEDER

The present invention relates generally to power-driven conveyors and particularly to conveyors which include means for changing the attitude of items conveyed relative to the conveyed direction by conveying randomly faced items and turning the items to a uniform-facing direction, the items being conveyed by a rotating means. Alternatively, the invention relates generally to article dispensers which include orienting features which selectively separate articles from a supply by a rotatable means.

Power-driven conveyors which include means for changing the attitudes of randomly oriented items to a uniform facing are known which include a rotating means for conveying the articles in question. A particularly pertinent example is to be found in U.S. Pat. No. 4,007,854. That patent discloses an apparatus for feeding articles in serial order from a bulk supply with the minimum of abrasion and impact damage to the articles. The apparatus includes a disc angularly mounted within an encircling rim such that the edge of the disc attains substantially the same height as the rim at one location around its periphery which point constitutes an article transfer station. Elsewhere, the disc is at a lower elevation than the rim, thereby forming a reservoir from which articles are fed. The rim and disc are rotated in a common angular direction either at the same speed or with the rim at a higher angular velocity than the disc.

The disc disclosed in U.S. Pat. No. 4,007,854 is shaped to have a non-planar surface so as to achieve a lower angular velocity for delivery of articles from the reservoir portion of the apparatus at the article-transfer station. The drive mechanism is inclined at the same angle of inclination as the disc with the driving means for the rim being either an interconnecting gear mechanism with the disc when the same velocity is desired, or a separate motor when a difference in velocity between the disc and rim is desired.

While the serial-feeding apparatus disclosed in U.S. Pat. No. 4,007,854 constituted a distinct advance over the art heretofore known, certain disadvantages have been noted such as the non-vertical alignment of the driving mechanism for the disc, the need for a separate driving mechanism where the disc is to be driven at a different angular velocity than the rim, and the disclosure of a disc which is substantially non-resilient, thereby mandating the use of materials having rather hard surfaces which might causes shock damage to the articles being fed or conveyed by the apparatus.

These and other disadvantages of the prior art apparatus are obviated by the present invention which is directed to an apparatus having many features in common with the prior art, but which includes a support surface fixed to a base of the apparatus in substantial alignment with the perpendicular axis about which the rim or annular surface is rotated. The fixed support surface is positioned substantially midway between the plane of the annular rim and the lowest extent of the cylindrical wall which depends from the rim. The rotating disc is mounted contiguously on the support surface substantially concentrically with the vertical axis. The rotating disk is driven by a drive shaft aligned with the perpendicular axis. A universal joint is slidably received on the top end of the drive shaft and is physically coupled to the rotatable disc. A drive cylinder coaxially surrounds the drive shaft, the drive cylinder being provided to drive the annular rim surrounding the disc. A single motor is provided which is coupled both to the drive shaft and to the drive cylinder. The angular velocity of the drive shaft and drive cylinder are determined by the size of toothed gears mounted on each and on the driving rotor.

The disc carrying the articles to be conveyed and dispensed is generally not self-supporting, but rather assumes the configuration of the supporting surface which, of course, may be either planar or non-planar. The disc is preferably composed of an artificial resin, i.e., a molded or cast plastic such as urethane, and is preferably elastomeric so as to reduce shock damage to the articles being handled. Further, the disc is preferably made of a material selected for low friction characteristics relative to the articles being handled so as to permit the apparatus to operate at the lowest reasonable angular velocity.

Many of the additional features and advantages of an apparatus according to the present invention will be apparent from the accompanying drawing illustrating the invention and showing a preferred embodiment exemplifying the best mode of carrying out the invention as presently perceived.

Figure 1:
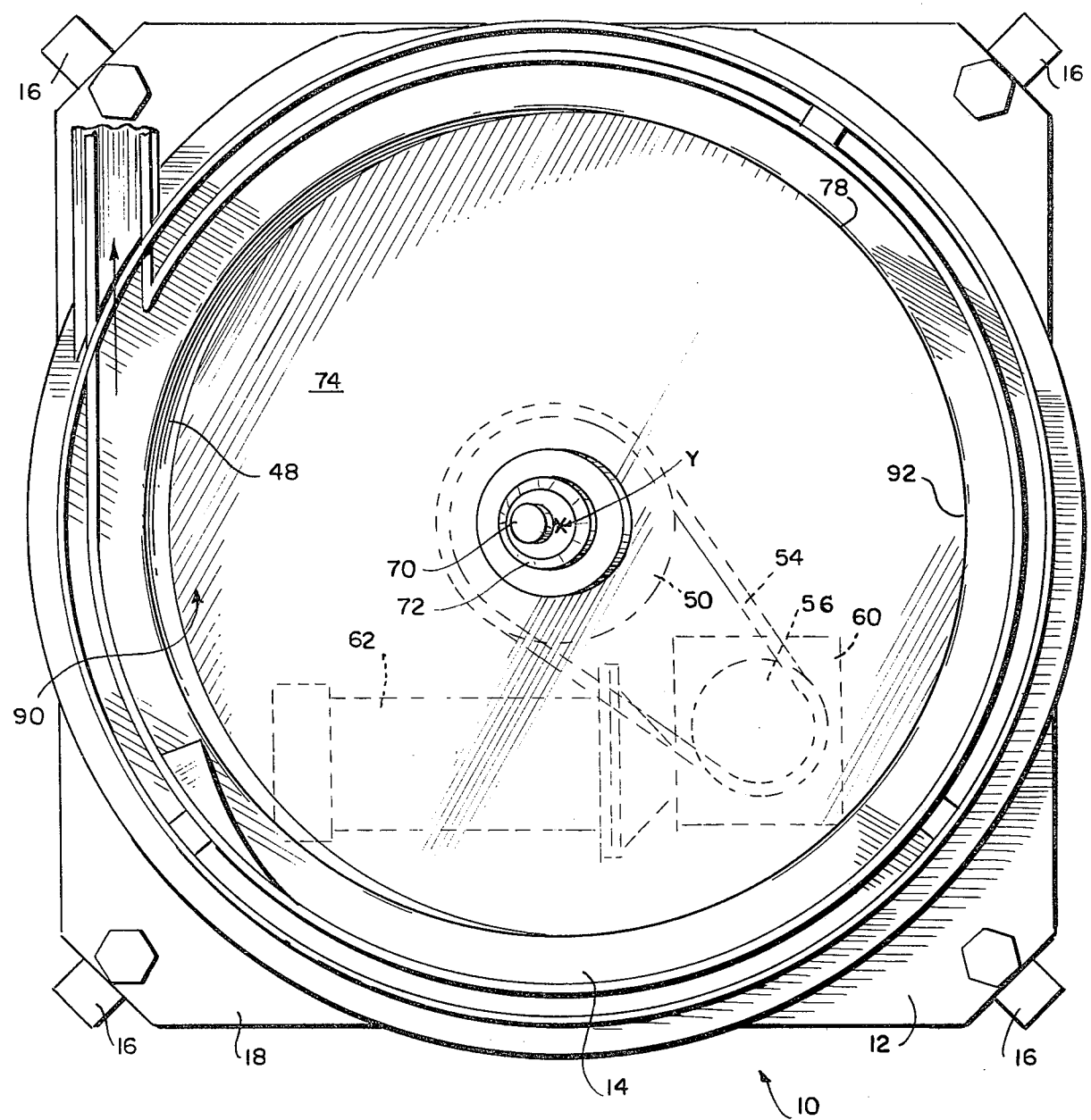
FIG. 1 is a plan view of the apparatus.

The feeding apparatus 10 includes a base 12 and a substantially horizontal, annular surface 14 which rotatably moves with respect to the base 12 about an axis Y—Y perpendicular to the base 12. To ensure the perpendicularity of axis Y—Y, the base 12 includes a plurality of vertically adjustable feet 16 supporting a flat base plate 18. A plurality of risers 20 are provided which support lower bearing plate 22 above base plate 18 in parallel fashion. A lower bearing 24 is received in bearing plate 22 and in turn receives drive shaft 26 which is aligned with axis Y—Y. A tubular riser 27 is secured to lower bearing plate 22 by screw fasteners 25. The riser 27 extends upwardly therefrom to receive screw fasteners 28 holding bearing keeper 31 and support 30 in fixed relationship to riser 27. Upper shaft bearing 32 supported by support 30 receives the upper end of drive shaft 26 to ensure its alignment with axis Y—Y.

The substantially horizontal, annular surface or rim 14 is maintained horizontal by means of a lower hub bearing 34 and an upper hub bearing 36 which are mounted on the outside of tubular support 27 and separated by tubular spacer 29. The bearings 34 and 36 support hub 38 in coaxial alignment with axis Y—Y. A circular support plate 40 is fixed to the top of hub 38 to rotate with hub 38. A tub 42 is also fixed to hub 38 on top of circular support plate 40 for rotation therewith. The support plate 40 and tub 42 are secured in place by keeper 44 and fasteners 46. At its periphery, tub 42 includes a cylindrical wall 48. The cylindrical wall is preferably slightly arcuate, extending upwardly from the bottom of tub 42 and extending outwardly at its upper edge to form horizontal flange or rim 14. The rim 14 and cylindrical wall 48 subtending from rim 14 are rotated by means of sprocket 50 fixed to hub 38 by fasteners 52, the sprocket 50 being engaged by chain 54 which is driven by sprocket 56. The sprocket 56 is in turn mounted on shaft 58 of reductor 60 which is in turn driven by motor 62.

Figure 2:
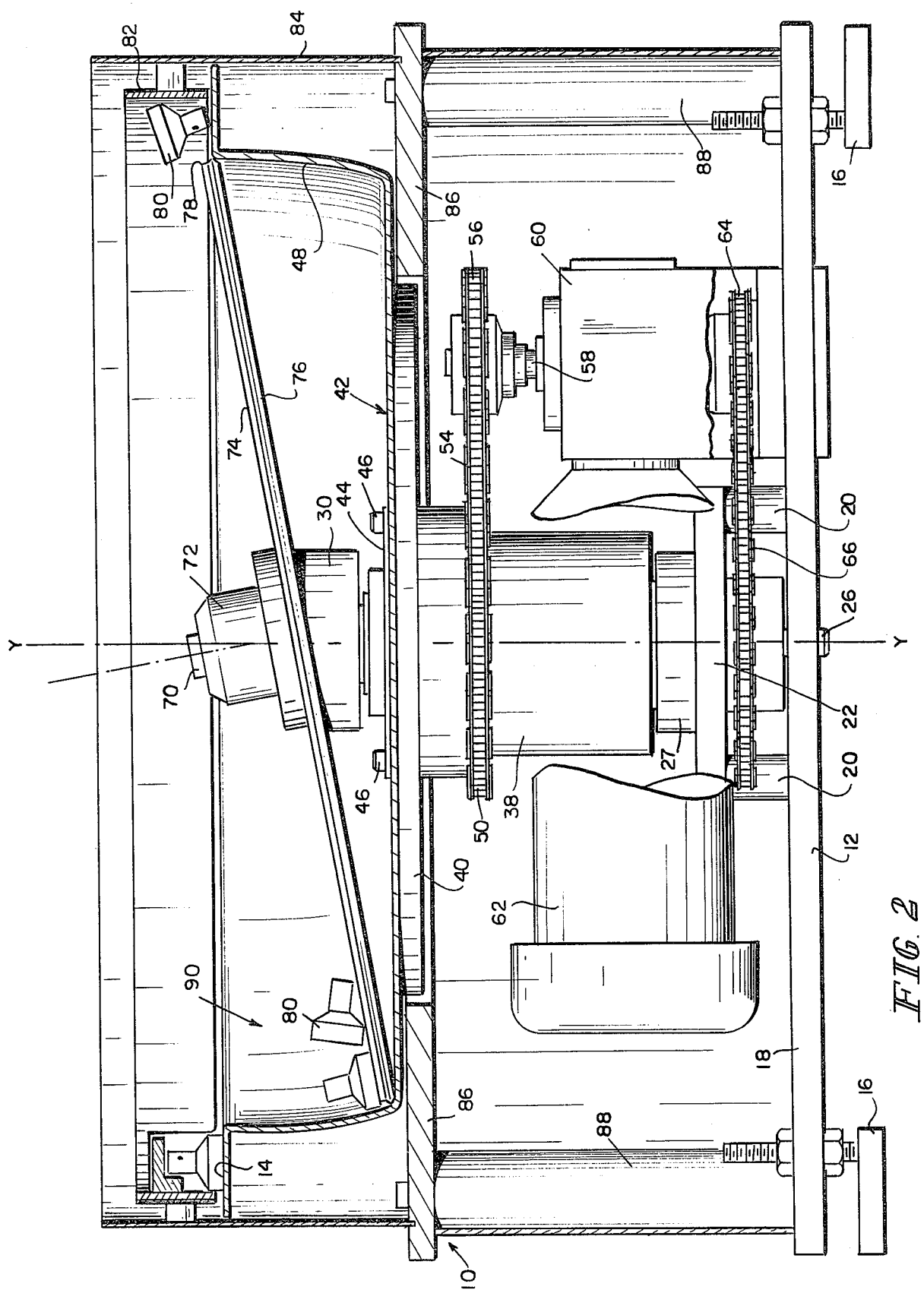
FIG. 2 is a sectional view of the apparatus shown in FIG. 1.
Figure 3:
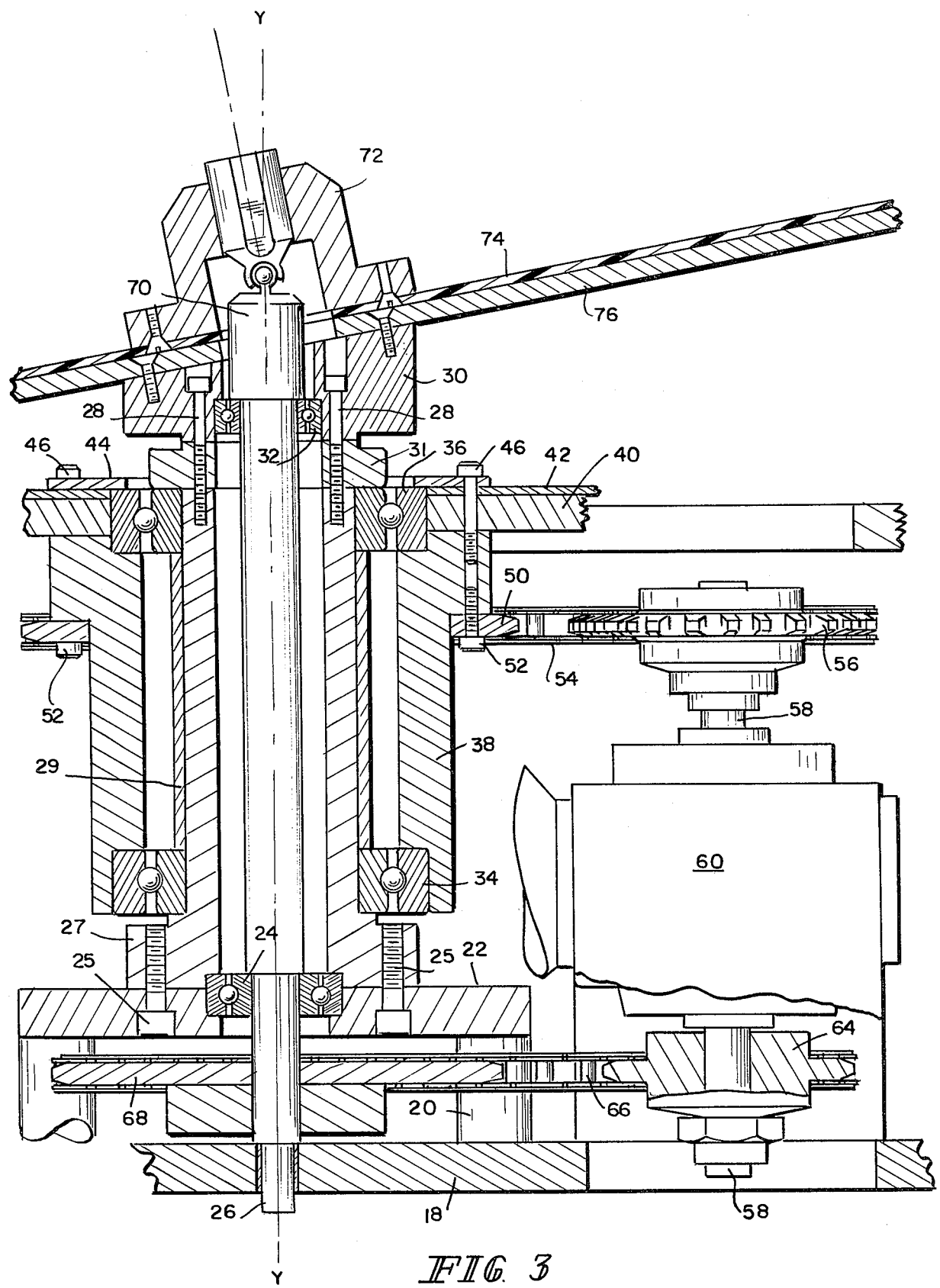
FIG. 3 is a sectional detail of the drive mechanism of the apparatus shown in FIGS. 1 and 2.

Another sprocket 64 fixed to the lower end of drive shaft 58 of reductor 60 drives a second chain 66 which engages sprocket 68 on the lower end of shaft 26. A universal joint 70 is slidably received on the upper end of shaft 26 for rotation therewith. A hub 72 is fixed to an upper portion of universal joint 70; and disc 74 is, in turn, fixed to hub 72. Both disc 74 and hub 72 rotate with drive shaft 26. Disc 74 is supported by support surface 76 which is fixed to support 30. The angle of inclination of support surface 76 is determined by support 30. Support surface 76, in turn, defines the angle of inclination of disc 74. The outer rim 78 of disc 74 is contiguous to cylindrical wall 48. Vertical positioning and angle of inclination of support surface 76 is such that the rim 78 of disc 74 reaches the elevation of annular surface 14 at one point shown on the right side of FIG. 2, which point constitutes the transfer point 92 for transferring articles from the disc 74 to annular surface 14. On the opposite side of the apparatus, the disc 74 extends downwardly so as to form, with wall 48, a reservoir 90 for parts or articles which are to be handled by the apparatus 10.

The orientation of articles 80 is achieved by means of the interaction of the articles 80 carried by moving annular surface 14 with peripheral rail 82 and appropriate means mounted thereto, known in the art for orienting various articles. The peripheral rail 82 is fixed to shroud 84 which is, in turn, supported on elevated support plate 86 by a plurality of legs 88 fixed to base plate 18.

In operation, a number of articles 80 sought to be sorted or manipulated are placed on disc 74 in the reservoir portion 90 of the apparatus 10. The disc is rotated and the articles 80 carried from the reservoir portion 90 to the transfer point 92 of the apparatus. The inclination of the disc support 76 and the composition of disc 74 is selected such that the static friction between disc 74 and articles 80 will permit the articles to be carried upward toward the transfer point. The speed of rotation of the disc is selected such that at the transfer point, the static friction between articles 80 and disc 74 is overcome by the centrifugal force acting on articles 80, thereby causing the articles to move outward onto rim 14. The relative angular velocities between disc 74 and rim 14 are determined by the relative sizes of sprockets 50, 56, 64, and 68. The rim 14, which is rotating preferably at a higher angular velocity than that of the disc, receives the articles 80 in spaced relationship one from the other and carries the articles 80 around the periphery of the apparatus 10 in contact with fixed rail 82. As the articles 80 pass various selected points on the rail 82, various appropriate means operate on articles 80 so as to orient them uniformly. Articles which are not properly oriented are reintroduced into the reservoir portion 90 of the apparatus 10. In general, the articles remain in spaced relationship one to another throughout the manipulating pocess on rim 14 and, if oriented properly, exit from the rim by means of an appropriate exit station.

While the invention has been described in detail with reference to the illustrated preferred embodiment thereof, it will be appreciated that variations and modifications can be made to the invention as defined by the appended claims.

I claim:

1. An apparatus for feeding articles in serial order comprising:
    a base,
    a substantially horizontal, annular surface rotatably movable with respect to the base about an axis perpendicular to the base,
    a cylindrical wall subtending from the inner periphery of the annular surface and rotatably movable therewith,
    an inclined support surface fixed stationary relative to the base, the point of intersection of the support surface with the axis being positioned substantially midway between the plane of the annular surface and the lowest extent of the cylindrical wall, and
    a disc mounted for rotational movement on the support surface substantially concentric with the axis, the periphery of the disc being immediately adjacent to the cylindrical wall, the disc being inclined by the support surface such that the uppermost portion of the periphery of the disc is immediately adjacent the annular surface.

2. The apparatus of claim 1 further comprising means for rotating the disc including a drive shaft substantially coincident with the perpendicular axis.

3. The apparatus of claim 2 further comprising means coaxial with the drive shaft for rotating the horizontal, annular surface.

4. The apparatus of claim 3 further comprising a single-motor means coupled to the drive shaft for rotating the disc and to the means for rotating the annular surface.

5. The apparatus of claim 1 wherein the disc is contiguous to the inclined support surface, the support surface extending radially to adjacency with the cylindrical wall.

6. The apparatus of claim 1 wherein the support surface is planar.

7. The apparatus of claim 1 wherein the disc is composed of an artificial resin.

8. The apparatus of claim 7 wherein the disc of artificial resin is composed of a low durometer elastomer.

* * * * *

REEXAMINATION CERTIFICATE (407th)

United States Patent [19]

Doty

[11] B1 4,429,808

[45] Certificate Issued Oct. 22, 1985

[54] DUAL DRIVE ROTARY FEEDER

[75] Inventor: Myron L. Doty, Greenwood, Ind.

[73] Assignee: Moorfeed Corporation, Indianapolis, Ind.

Reexamination Request:
No. 90/000,697, Dec. 21, 1984

Reexamination Certificate for:
Patent No.: 4,429,808
Issued: Feb. 7, 1984
Appl. No.: 331,624
Filed: Dec. 17, 1981

[51] Int. Cl.⁴ .................................................. B65H 3/42
[52] U.S. Cl. ..................................... 221/167; 133/3 A
[58] Field of Search .............. 198/391, 392; 221/167, 221/186, 187, 160, 161, 173; 233/7; 494/51, 52, 55; 133/8 A, 8 R; 209/73

[56] References Cited

U.S. PATENT DOCUMENTS

| | | | |
|---|---|---|---|
| 3,960,293 | 6/1976 | Sweet et al. | 221/167 X |
| 4,007,854 | 2/1977 | Ervine | 221/167 |
| 4,098,280 | 7/1978 | Ristvedt et al. | 133/8 R X |
| 4,211,248 | 7/1980 | Lafon | 221/186 X |

*Primary Examiner*—Stanley H. Tollberg

[57] ABSTRACT

A serial-orienting and feeding apparatus is disclosed which includes a stationary support fixed substantially midway between the rim of a rotatable tub and the bottom of the tub. A disc is mounted for rotation on the support surface, the surface configuration of the disc being defined by the support surface such that the uppermost portion of the periphery of the disc is immediately adjacent the rim of the tub. The rim and tub are coaxially driven by a common motor driving a two-ended reductor having a chain and sprocket drive on each end. The relative angular velocities of the tub and disc are determined by the sprocket sizes employed. The disc is preferably composed of an artificial resin; i.e., a molded or cast plastic, such as urethane having appropriate elastomeric and surface friction characteristics relative to the articles to be handled by the apparatus.

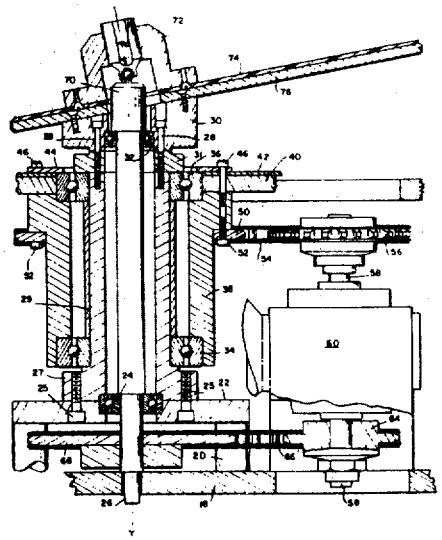

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-8, dependent on an amended claim, are determined to be patentable.

New claims 9-11 are added and determined to be patentable.

1. An apparatus for feeding articles in serial order comprising:
   a base,
   a substantially horizontal, annular surface rotatably movable with respect to the base about an axis perpendicular to the base,
   a cylindrical wall subtending from the inner periphery of the annular surface and rotatably movable therewith,
   an inclined support surface fixed stationary relative to the base, *the axis passing through the support surface,* the point of intersection of the support surface with the axis being positioned substantially midway between the plane of the annular surface and the lowest extent of *an article-contacting portion of* the cylindrical wall, and
   a *planar* disc mounted for rotational movement on the support surface substantially concentric with the axis, the periphery of the disc being immediately adjacent to the cylindrical wall, the disc being inclined by the support surface such that the uppermost portion of the periphery of the disc is immediately adjacent the annular surface, *the disc remaining planar during rotation.*

9. *The apparatus of claim 2 further comprising a universal joint mounted on an upper end of the drive shaft, and t hub fixed to an upper portion of the universal joint to otate with the shaft, the hub being fixed to the planar disc.*

10. *An apparatus for feeding articles in serial order omprising:*
    *a base,*
    *a substantially horizontal, annular surface rotatably movable with respect to the base about an axis perpendicular to the base,*
    *a cylindrical wall subtending from the inner periphery of the annular surface and rotatably movable therewith,*
    *a planar disc situated within the cylindrical wall, the periphery of the disc being immediately adjacent to the cylindrical wall, the disc being inclined to form an article reservoir with the cylindrical wall, and*
    *an inclined support surface surrounding the axis and fixed stationary relative to the base, the point of intersection of the support surface with the axis being positioned substantially midway between the plane of the annular surface and the lowest extent of the article reservoir formed by the cylindrical wall and planar disc, the disc being mounted for rotational movement on the support surface substantially concentric with the axis, the disc being inclined by the support surface such that the uppermost portion of the periphery of the disc is immediately adjacent the annular surface, the disc remaining planar during rotation.*

11. *An apparatus for feeding articles in serial order comprising:*
    *a base,*
    *a substantially horizontal, annular surface rotatably movable with respect to the base about an axis perpendicular to the base,*
    *a cylindrical wall subtending from the inner periphery of the annular surface and rotatably movable therewith,*
    *a planar disc situated within the cylindrical wall, the periphery of the disc being immediately adjacent to the cylindrical wall, the disc being inclined such that the uppermost portion of the periphery of the disc is immediately adjacent the annular surface and the lower portion of the disc forms an article reservoir with the cylindrical wall,*
    *an inclined support surface surrounding the axis and fixed stationary relative to the base, the disc being inclined by the support surface, the point of intersection of the support surface with the axis being positioned substantially midway between the plane of the annular surface and the lowest extent of the article reservoir formed by the cylindrical wall and planar disc, the disc being mounted for rotational movement on the support surface substantially concentric with the axis, and*
    *means for rotating the disc including a drive shaft substantially coincident with the perpendicular axis, a universal joint mounted on an upper end of the drive shaft, and a hub fixed to an upper portion of the universal joint to rotate with the shaft, the hub being fixed to the planar disc, the disc remaining planar during rotation.*

* * * * *